(12) United States Patent
Tuvim

(10) Patent No.: US 7,371,038 B2
(45) Date of Patent: May 13, 2008

(54) TRAILER WITH HOIST FOR CONTAINER AND THE LIKE

(76) Inventor: Dory Tuvim, 478 Kitley Line 8, Frankville, Ontario (CA) K0E 1H0

( * ) Notice: Subject to any disclaimer, the term of this patent is extended or adjusted under 35 U.S.C. 154(b) by 229 days.

(21) Appl. No.: 10/798,181

(22) Filed: Mar. 10, 2004

(65) Prior Publication Data

US 2004/0223835 A1    Nov. 11, 2004

(30) Foreign Application Priority Data

Mar. 10, 2003    (CA) .................................. 2421446

(51) Int. Cl.
*B60P 3/00* (2006.01)
(52) U.S. Cl. ..................... 414/459; 414/460; 414/495
(58) Field of Classification Search ................ 414/494, 414/460, 459, 495
See application file for complete search history.

(56) References Cited

U.S. PATENT DOCUMENTS

| | | | | |
|---|---|---|---|---|
| 2,808,289 | A | 10/1957 | Scoby | 296/35 |
| 3,027,025 | A | 3/1962 | Tantlinger | 214/38 |
| 3,111,341 | A | 11/1963 | Fujioka et al. | 296/35 |
| 3,317,219 | A | 5/1967 | Hindin et al. | 280/415 |
| 3,348,711 | A * | 10/1967 | Gove | 414/459 |
| 3,387,853 | A | 6/1968 | Sueoka | 296/23 |
| 3,472,407 | A * | 10/1969 | Corompt | 414/541 |
| 3,474,924 | A | 10/1969 | Wheeler | 214/390 |
| 3,520,431 | A * | 7/1970 | Tax | 414/460 |
| 3,536,161 | A * | 10/1970 | Clarke | 187/244 |
| 3,614,153 | A | 10/1971 | Tantlinger | 296/35 |
| 3,669,290 | A * | 6/1972 | Doyle | 414/459 |
| 3,724,695 | A * | 4/1973 | Taylor | 414/484 |
| 3,767,255 | A | 10/1973 | Bertolini | 296/35 A |
| 3,874,719 | A * | 4/1975 | Goyarts | 414/460 |
| 3,892,423 | A | 7/1975 | Smith | 280/106 T |
| 4,155,471 | A | 5/1979 | Yancy | 414/420 |
| 4,213,728 | A * | 7/1980 | McKenzie | 414/446 |
| 4,321,000 | A | 3/1982 | Novak | 410/76 |
| 4,673,328 | A * | 6/1987 | Shiels | 414/471 |
| 4,836,735 | A | 6/1989 | Dennehy, Jr. et al. | 414/475 |

(Continued)

FOREIGN PATENT DOCUMENTS

DE    2520645    11/1976

(Continued)

*Primary Examiner*—James Keenan
(74) *Attorney, Agent, or Firm*—Merchant Gould P.C.

(57) ABSTRACT

A trailer for transporting a container provided with lifting holes is disclosed. The trailer has a generally U-shaped frame, the front thereof being provided with a hitch for removably attaching the trailer to a tractor, the generally U-shaped frame being shaped and sized to receive the container therein, the frame being provided with wheels on each side thereof. The trailer also includes a plurality of retractable lifting members, each retractable lifting member being positioned proximate a lifting hole of the container when the container is received within the frame, the retractable lifting members being movable between an inoperative position where the lifting members are disengaged from the lifting holes, and an operative position where the lifting members engage the lifting holes and are extendable to lift the container. A controller is also provided for controlling the lifting members. The trailer of the present invention is useful for dropping and picking up containers at locations where containers could not previously be located.

2 Claims, 5 Drawing Sheets

U.S. PATENT DOCUMENTS

| | | | |
|---|---|---|---|
| 5,322,314 A | 6/1994 | Blum | 280/423.1 |
| 5,373,593 A * | 12/1994 | Decky et al. | 4/661 |
| H1587 H | 9/1996 | Van Valkenburgh et al. | 280/789 |
| 5,836,657 A | 11/1998 | Tilley et al. | 298/1 A |
| 5,924,829 A | 7/1999 | Hastings | 410/82 |
| 5,988,597 A * | 11/1999 | Egan | 254/279 |
| 6,099,232 A * | 8/2000 | Dixon et al. | 414/494 |
| 6,210,088 B1 | 4/2001 | Crosby | 410/35 |
| 6,419,440 B1 * | 7/2002 | Smith | 414/460 |
| 6,939,098 B2 * | 9/2005 | Schults | 414/459 |
| 2002/0061247 A1 * | 5/2002 | Kele | 414/563 |
| 2003/0007852 A1 * | 1/2003 | Bernards | 414/460 |

FOREIGN PATENT DOCUMENTS

| | | |
|---|---|---|
| GB | 1181802 | 2/1970 |
| GB | 2104487 | 3/1983 |
| GB | 2316932 | 9/1996 |

\* cited by examiner

TRAILER WITH HOIST FOR CONTAINER AND THE LIKE

FIELD OF THE INVENTION

The present invention is directed to a trailer which can load and unload a container at a given location.

BACKGROUND OF THE INVENTION

It is well known in the art to make use of shipping containers to transport goods from one place to another.

Typically, containers are loaded and unloaded from trucks, train beds, etc. at locations where special cranes are located. However, this has the disadvantage of being able to place a container only at locations which are so equipped with the equipment.

In the agricultural field, it would be advantageous to have a container on site during harvesting, to avoid a plurality of manipulations and transport solutions. However, the cranes that are typically used to move containers are expensive to build, maintain and operate, and it is unrealistic to think that a farmer or cooperative can afford such a piece of equipment.

SUMMARY OF THE INVENTION

It is an object of the present invention to provide a trailer equipped with a hoist, to load and unload a container at a location. In accordance with the invention, this object is achieved with a trailer for transporting a container, said container being provided with lifting holes at least at each corner thereof; said trailer comprising:

a generally U-shaped frame, the front thereof being provided with means for removably attaching said trailer to a tractor, said generally U-shaped frame being shaped and sized to receive said container within said frame, said frame being provided with wheels on each side of said frame;

a plurality of retractable lifting members, each retractable lifting member being positioned proximate a lifting hole of said container when said container is received within said frame, said retractable lifting members being movable between an inoperative position where said lifting members are disengaged from said lifting holes, and an operative position where said lifting members engage said lifting holes and are extendable to lift said container; and means for controlling said plurality of lifting members.

DESCRIPTION OF THE DRAWINGS

The present invention will be better understood after reading a description of a preferred embodiment thereof made in reference to the following drawings in which.

DESCRIPTION OF A PREFERRED EMBODIMENT OF THE INVENTION

Figure 1:
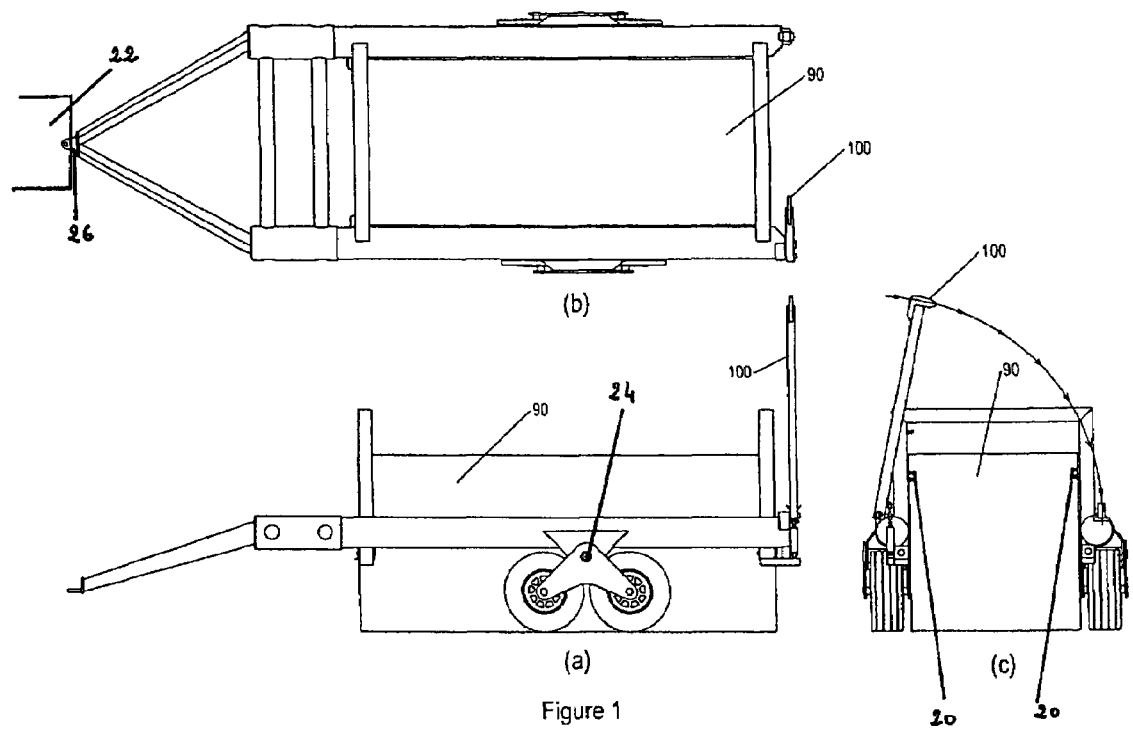
FIGS. 1(a), 1(b) and 1(c) are respectively side, top and rear views of a trailer according to a preferred embodiment of the invention, with a container on the ground being ready for lifting.

The present invention is directed to a trailer 10 as illustrated in the accompanying Figures. The trailer 10 is particularly adapted to transport to a location a shipping container. The trailer 10 of the present invention allows transportation, dropping off and picking up of a container in areas where specialised equipment such as cranes, etc. is not present. In a preferred embodiment of the invention, the trailer 10 can be used on site in a field where harvesting is being performed. Without the trailer 10 of the present invention, the container cannot be located in situ.

In general terms, the trailer 10 of the present invention has a generally U-shape as illustrated in FIG. 1(b), which is a top view of the trailer 10. At predetermined locations on the frame 11 of the trailer 10, i.e. the four corners, lifting members 30 are located which are adapted to engage the holes or lifting points 20 provided on a container 90 and to lift the same off the ground by a sufficient amount (approximately 30 cm to 120 cm or about 12-48 inches). The trailer 10 is also provided with wheels 13 or endless tracks so that it may be moved once the container 90 has been loaded or unloaded.

Figure 4:
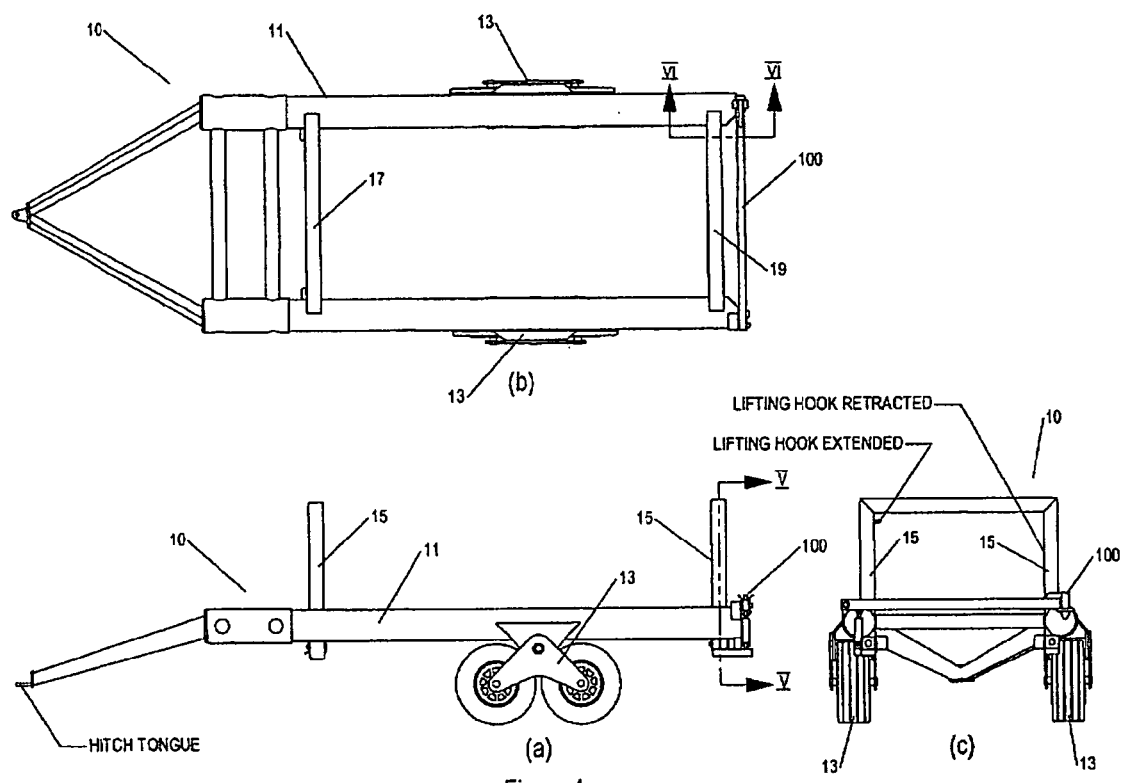
FIGS. 4(a), 4(b) and 4(c) are respectively side, top and rear views of the trailer of FIG. 1.

Referring now specifically to FIGS. 4(a)-4(c), there is shown the trailer 10 according to a preferred embodiment. The trailer 10 consists of a generally U-shaped frame 11, provided with wheels 13 on each side of the frame 11. In the illustrated embodiment, the wheel set 13 consists of a walking axle 24, but any other arrangement of wheels 13 will meet the objects of the present invention.

Figure 2:
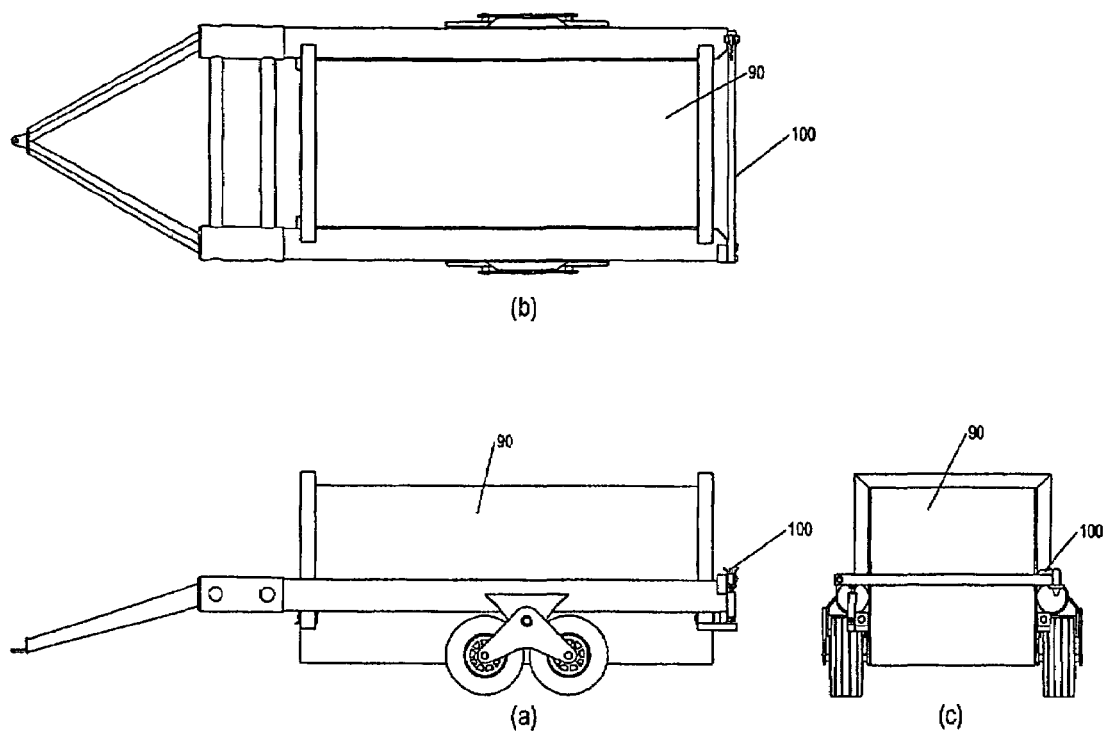
FIGS. 2(a), 2(b) and 2(c) are respectively side, top and rear views of the trailer of FIG. 1, with the container lifted and ready for transport.

As can be appreciated, the frame 11 is shaped and sized to receive a container 90 therein, as better shown in FIGS. 1 and 2. The container 90 is equipped, as is standard in the industry, with lifting holes 20 located at each corner of the container 90. These holes 20 are generally located approximately 10 cm (4 inches) below the top of the container 90.

In a preferred embodiment, the trailer 10 is provided with vertical beams 15 which are located on the trailer 10 so as to be proximate the lifting holes 20 of the container 90. The front beams 15 are interconnected with a top cross member 17 and the rear beams 15 are interconnected with another top cross member 19. The cross members 17, and 19 serve to increase the stability of the trailer 10.

Figure 5:
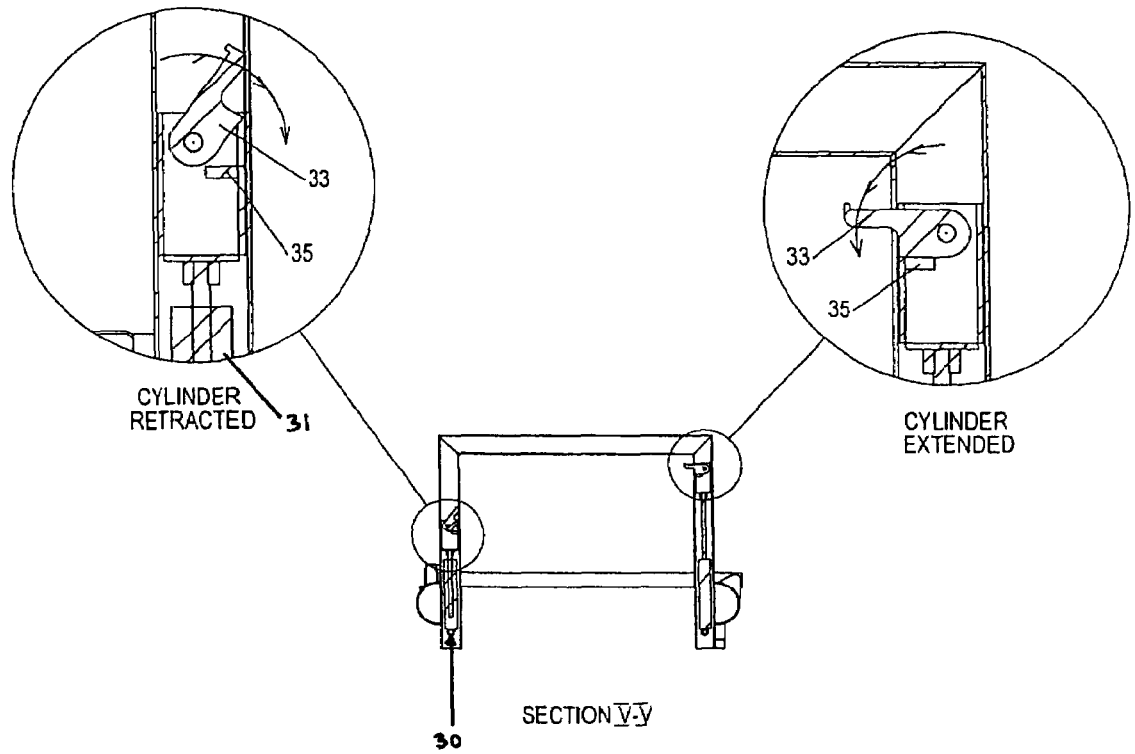
FIG. 5 is a cross-sectional view of the support beams of the trailer of FIG. 1 taken along line V-V.
Figure 6:
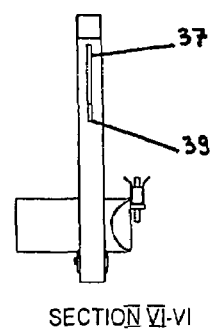
FIG. 6 is a cross-sectional view taken along line VI-VI.

Within each beam 15 is located a lifting member 30, which consists of a hydraulic cylinder 31 movable between an extended position (right hand side of FIG. 5) and a retracted position (left hand side of FIG. 5).

At the top of the cylinder 31 is located a lifting hook 33. The lifting hook 33 is inwardly biased, so that lifting hooks 33 on the right hand side of the trailer 10, when looking at the same from the rear are biased in a counter-clockwise direction, and the lifting hooks 33 on the left hand side of the trailer 10 are biased in a clockwise direction (see the arrows on FIG. 5). Preferably, a stop 35 is provided so that motion of the lifting hook 33 is limited in the direction of bias.

The beams 15 are further provided with a longitudinal slot 37 on an inside face thereof. The slot 37 has a predetermined length, the purpose of which will be explained hereinafter.

When the lifting member 30 is in the retracted position, as shown on the left hand side of FIG. 5, the lifting hook 33 is located within the beam 15. This effectively "hides" the lifting hook 33, and provides the necessary clearance between the beams 15 and the container so that the trailer 10 can be backed up to surround the container 90, or moved forward to clear the container 90.

When the container is ready to be picked up, as shown in FIG. 1, the container 90 fits snugly within the opening defined by the U-shaped trailer 10, and the beams 15, and consequently the lifting members 30, are located proximate the corresponding lifting hole 20 on the container 90.

The hydraulic cylinders 31 are then extended. When the lifting hook 33 reaches the bottom end 39 of the longitudinal slot 37, it extends out of the beam 15. Preferably, this position is just below the lifting hole 20 on the container 90, to allow the lifting hook 33 to properly deploy.

As the cylinder 31 is further extended, the lifting hook 33 engages the lifting hole 20 of the container 90, and gradually lifts the container 90 off the ground, until the top of the container 90 reaches the bottom of the top cross members 17,19. Thus, the length of the slot 37 essentially corresponds to the distance the container 90 will be lifted off the ground.

This is better shown in FIG. 2, showing the container 90 lifted off the ground and ready for transport.

Figure 3:
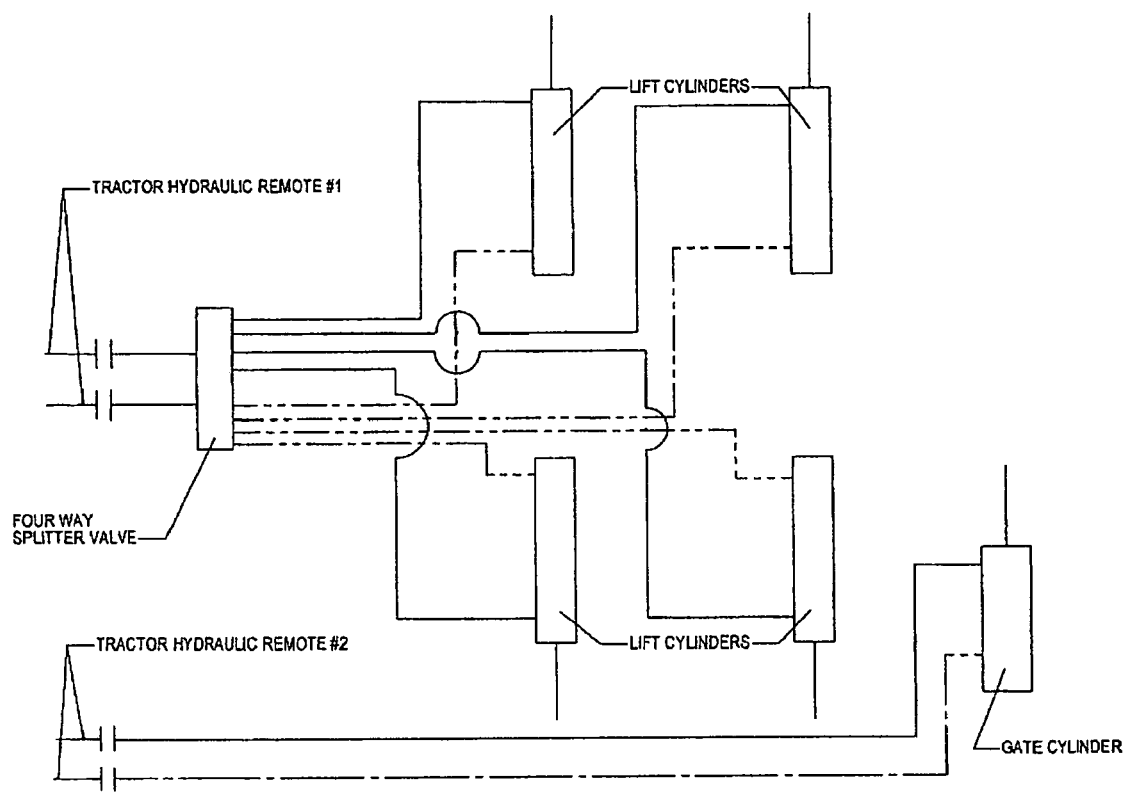
FIG. 3 is a schematic representation of the hydraulic system for use with the trailer of FIG. 1.

FIG. 3 schematically illustrates the hydraulic circuit for the trailer 10. One important aspect is that the four cylinders 31 extend and retract substantially at the same rate, to prevent buckling of the trailer 10.

As is usual, the frame 11 is provided with means, such as a fifth wheel 26, to attach the trailer 10 to a tractor 22.

In another preferred embodiment, the trailer 10 is further provided with a gate 100 at a rear end thereof, in order to further increase the stability of the trailer 10, particularly one that has been loaded, and to compensate for torsion loads.

Consequently, the trailer 10 can be used to drop and pick-up a container 90 in a particular location. When the container 90 is ready to be moved, the trailer 10 is approached to the container 90, the frame 11 is made to engage the holes 20 and the container 90 is lifted off the ground and driven away.

Although the present invention has been explained hereinabove by way of a preferred embodiment thereof, it should be pointed out that any modifications to this preferred embodiment within the scope of the appended claims is not deemed to alter or change the nature and scope of the present invention.

The invention claimed is:

1. A trailer for transporting a container, said container being provided with lifting holes at least at each corner thereof; said trailer comprising:
   a generally U-shaped frame, the front thereof being provided with means for removably attaching said trailer to a tractor, said generally U-shaped frame being shaped and sized to receive said container within said frame, said frame being provided with wheels on each side of said frame;
   a plurality of retractable lifting members, each retractable lifting member being positioned proximate a lifting hole of said container when said container is received within said frame, said retractable lifting members being movable between an inoperative position where said lifting members are disengaged from said lifting holes, and an operative position where said lifting members engage said lifting holes and are extendable to lift said container,
   wherein said lifting members each comprise a hydraulic cylinder provided with a lifting hook, each said lifting hook being inwardly biased with respect to the frame, and
   wherein each of said hydraulic cylinders are housed within a corresponding substantially vertical beam fastened to said frame, and
   wherein said vertical beams comprise front vertical beams interconnected at a top portion thereof with a top cross members, and
   wherein said vertical beams comprise rear vertical beams interconnected at a top portion thereof with another top cross members; and
   wherein each of said vertical beams include a vertical slot having a predetermined length,
   whereby when the lifting members are in said inoperative position, said hydraulic cylinders are retracted and said lifting hooks are located within the corresponding vertical beam below a bottom end of said vertical slot, and
   wherein when said cylinders are extended, said lifting hooks reach said bottom end of said vertical slots and said inward biasing causes said hooks to deploy outside of said vertical slot until contact with said lifting holes of said container, and
   wherein each of said lifting hooks engage said lifting holes and lift said container while translating vertically along said predetermined lengths until a top portion of said container contacts a bottom portion of each of said top cross members; and
   means for controlling said plurality of lifting members.

2. A trailer according to claim 1, wherein said trailer is further provided with a rear gate.

* * * * *